April 27, 1954 H. W. HAWK 2,677,043

LAMP ATTACHMENT FOR TELEPHONE INSTRUMENTS

Filed Aug. 31, 1951 2 Sheets-Sheet 1

INVENTOR

HERMAN W. HAWK

BY

McMorrow, Berman + Davidson

ATTORNEYS

April 27, 1954 H. W. HAWK 2,677,043

LAMP ATTACHMENT FOR TELEPHONE INSTRUMENTS

Filed Aug. 31, 1951 2 Sheets-Sheet 2

INVENTOR

HERMAN W. HAWK

BY

McMorrow, Berman & Davidson
ATTORNEYS

Patented Apr. 27, 1954 2,677,043

UNITED STATES PATENT OFFICE 2,677,043

LAMP ATTACHMENT FOR TELEPHONE INSTRUMENTS

Herman W. Hawk, Dallas, Tex.

Application August 31, 1951, Serial No. 244,571

2 Claims. (Cl. 240—2.17)

This invention relates to a lamp attachment for a telephone instrument. More specifically, the invention has reference to an attachment of the character described specially designed for association with a telephone instrument of the type in which a transmitter and receiver are combined.

One important object of my invention is to provide an attachment of the kind referred to having incorporated therein an improved means for illuminating the telephone instrument responsible to elevation of the combined transmitter-receiver from its cradle.

Another important object is to provide an improved lamp attachment as stated, which will not be connected to or involve modification of the telephone instrument in any way.

In carrying out a further important object of the invention, it is proposed to provide an attachment of the character stated in which the illuminating means thereof can be controlled manually, apart from its normal automatic switching arrangement, thus to permit use of the attachment as a night lamp or the like.

Still another important object is to provide a lamp attachment which will permit ordinary use of a telephone instrument, and will not interfere in any respect with conventional operation of said instrument.

Yet another object is to provide an attachment of the type stated which is so designed as to be capable of manufacture in any of various shapes, sizes, and ornamental designs, so as to be usable as a desk lamp, table lamp, boudoir lamp, or the like.

Other objects will appear from the following description, the claims appended thereto, and from the annexed drawing, in which like reference characters designate like parts throughout the several views, and wherein:

Figures 1, 2, 3, 8:
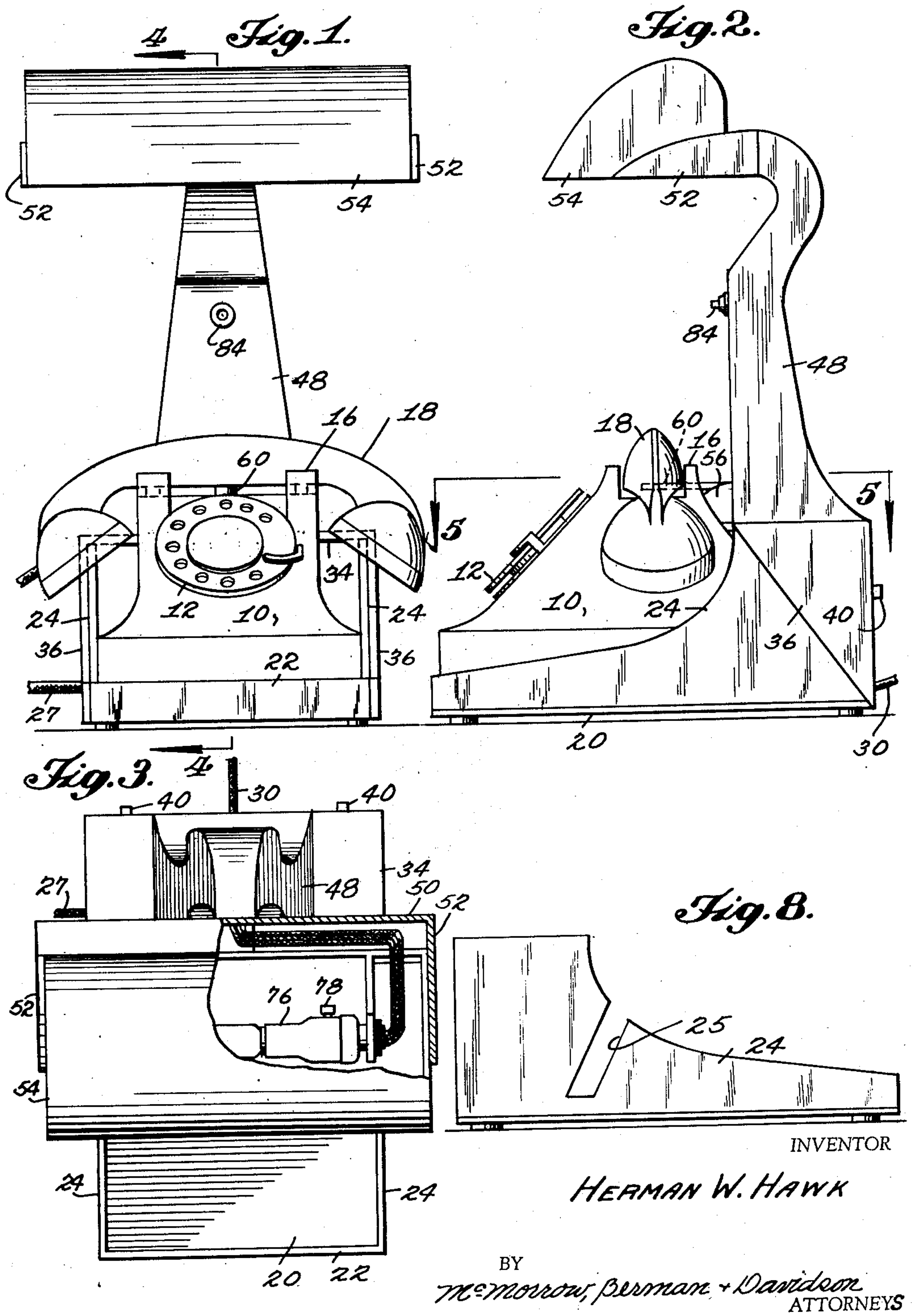
Figure 1 is a front elevational view of a lamp attachment formed in accordance with the present invention, a telephone instrument being illustrated in association therewith.
Figure 2 is a side elevational view of said lamp attachment and telephone instrument.
Figure 3 is a top plan view of the attachment, portions being broken away.
Figure 8 is a side elevational view of the lower portion of the attachment, illustrating the side opposite that shown in Figure 2.

Referring to the drawings in detail, the reference numeral 10 indicates the conventionally formed base of a telephone instrument of the type including a combined transmitter and receiver. The base 10, as is usual, is formed with a sloping front wall on which is mounted a rotatable dial switch 12. Formed in the back wall of the base, and extended horizontally toward the front wall, is a finger-receiving recess 14, adapted to receive the fingers of a user, for convenience in moving the instrument from place to place.

The instrument illustrated is provided at its upper end with a cradle 16, receiving the combined transmitter-receiver 18.

All the above is descriptive of thoroughly conventional telephone construction, and constitutes per se no part of the present invention.

In accordance with the present invention, I provide a tray adapted to receive the telephone instrument, said tray including a flat rectangular base 20, to the underside of which may be attached pads or cushions to prevent marring of a surface on which said base 20 is supported.

Secured to and extending upwardly from the front edge of the base or bottom plate 20 of the tray is a low retaining flange 22, and extending upwardly from the respective side edges of said bottom plate are side walls 24 that slope upwardly toward the rear portion of said bottom plate.

Formed in one of the side walls 24 is a downwardly extended slot 25 opening upon the edge of said side wall, that is adapted to receive the cord 27 extending from the base 10 of the telephone instrument to the transmitter-receiver 18.

A back stop 26 is rigidly mounted upon the bottom plate 20, extending upwardly from said bottom plate at a location spaced inwardly a short distance from the rear edge of the bottom plate. The back stop 26 is spaced from the retaining flange 22 a distance slightly greater than the front-to-rear dimension of the telephone instrument 10, and is formed with a vertical slot 28 medially disposed between the opposite sides of the tray, to receive the power cord 30 extending from the instrument. In this connection, the side walls 24 of the tray are spaced apart a distance slightly greater than the transverse dimension of the lower portion of the base 10 of the telephone instrument, and thus it will be seen that the telephone instrument can be placed in the tray and will be effectively held against slippage in any direction.

Secured to the back edges of the side walls 24 are brackets 32 the purpose of which is to permit a lamp base embodied in the invention to be attached to the instrument-supporting tray.

The lamp base is so formed as to straddle the rear portion of the tray, said rear portion being higher than the front portion of the tray by reason of the upwardly sloped side walls 24, which produce the effect of upwardly offsetting the rear end portions of the top edges of said side walls. The lamp base is formed with a horizontally disposed, rectangular top plate 34 extending transversely between and having its ends supported upon said upwardly offset rear end portions of the side walls. Depending from and rigidly secured to the end edges of the top plate are triangular side plates 36 that embrace the side walls 24 of the supporting tray, and rigidly secured to said side plates and top plate is a vertical back wall 38, that closes the rear end of the tray.

Transversely spaced apertures are provided in the back wall 38, that register with threaded apertures formed in the respective brackets 32 when the lamp base is positioned upon supporting tray, and extending through the registering openings are attaching screws 40, whereby the base is fixedly but removably connected to the supporting tray.

Figure 4:
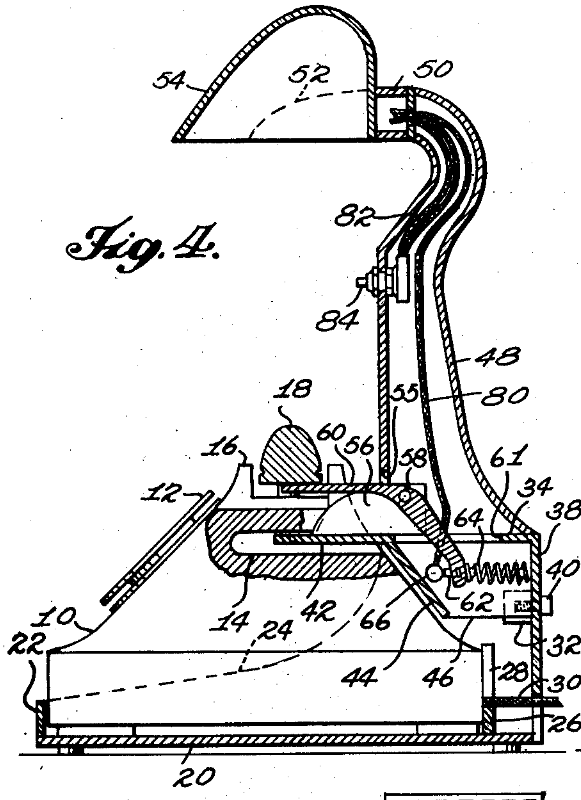
Figure 4 is a longitudinal sectional view taken substantially on line 4—4 of Figure 1.
Figure 7:
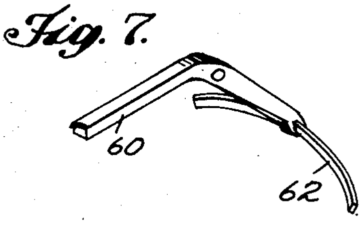
Figure 7 is a perspective view of the automatic switch lever.

Rigidly secured to and extending forwardly from the front edge of the top plate 34, and disposed medially between the ends of said top plate, is a horizontally disposed, rectangular tongue 42. A rearwardly and downwardly inclined brace plate 44 is also secured rigidly to the top plate 34, medially between the opposite sides of the device, and is spaced closely from and is parallel to the sloping rear surface of the telephone instrument when said instrument is supported within the tray (Figure 4). The brace plate spaces apart, and is rigid with, depending terminal support plates 46, that are secured to the underside of the top plate 34 and extend fully to the back wall 38 of the lamp base.

Rigid with and extending from the top plate 34 is a hollow standard 48, which can be of any desired shape or ornamental configuration, and at the upper end of said standard, a hollow cross head 50 is provided, from the ends of which extend forwardly projected arms 52 embracing and rigidly secured to the opposite ends of a lamp shade 54. The lamp shade 54 is so formed and arranged relative to the telephone instrument as to illuminate said instrument when a bulb covered by the shade is energized, thus to permit ready operation of the dial switch 12 or the making of notes during a telephone conversation, at all times.

Formed in the front of the standard 48, at the lower end thereof, is a vertical slot 55, and extending through said slot is a pair of parallel, vertically arranged ears 56, that are rigidly secured to and supported upon the tongue 42.

The ears 56 extend into the hollow standard 48, and within the standard are provided with a pivot pin 58 extending transversely therebetween, that supports a rockable angular lever 60.

The front end of the lever 60 is flattened, so as to extend under the combined transmitter-receiver, when the transmitter-receiver is positioned in its cradle 16. Said front or free end of the lever 60, as may be noted from Figure 4, projects forwardly from the standard and in this position of the lever, it is disposed approximately horizontally, in substantial parallelism with the tongue 42, which extends into the finger-receiving recess 14.

Figures 5, 9:
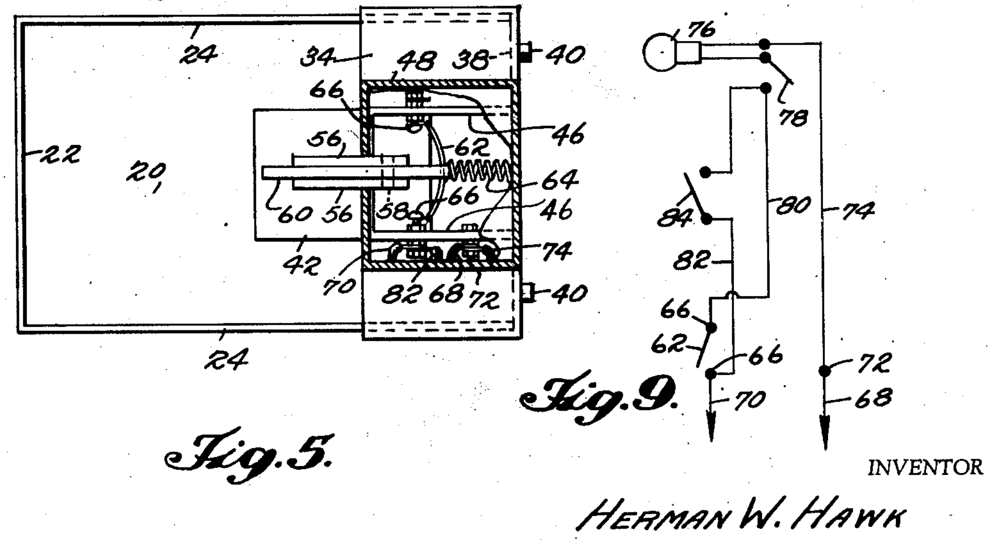
Figure 5 is a transverse sectional view taken substantially of line 5—5 of Figure 2.
Figure 9 is a schematic representation of the electrical circuit embodied in the attachment.

The other end of the lever is inclined downwardly and rearwardly from the pivot 58, through an opening 61 formed in the top plate 34 of the lamp base. Secured to the downwardly inclined leg of the lever, within the lamp base, is a transversely arranged, arcuate, conductive bar 62, said bar 62 being secured medially between opposite ends thereof to the lever 60, and extending in opposite directions from the lever, so as to have its ends spaced closely from the terminal support plates 46 (Figure 5).

Figure 6:
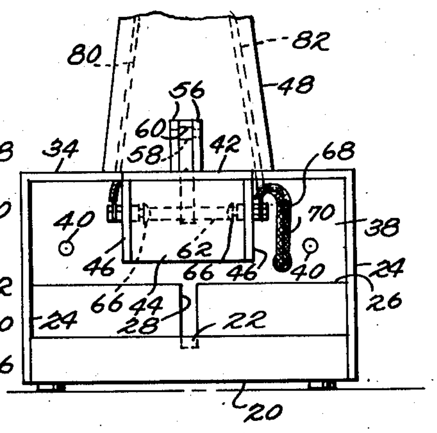
Figure 6 is a front elevational view of the lower portion of the attachment, the telephone instrument being removed.

As will be noted from Figures 4 and 6, the brace plate 44, terminal support plates 46, tongue 42, and ears 56 all cooperate to define a housing for the lever 60, said housing fitting snugly within a triangular area disposed above the back edge of the telephone instrument, which triangular area is defined between the sloping back surface of the telephone instrument and the vertical wall 38 common to the tray and lamp base.

Interposed between the lower end of the lever 60, and the back wall 38 of the base, is a spring 64, which is held under compression, so as to exert continuous, yielding pressure against the lever tending to bias the forwardly projected front leg of the lever upwardly, whenever said front leg is not restrained against upward movement by the transmitter-receiver 18.

Mounted upon the respective terminal support plates 46 are terminals or contacts 66. These extend inwardly toward one another, as may be noted from Figure 5, so as to be engaged by the opposite ends of the conductive bar 62 under the action of the spring 64 whenever the transmitter-receiver is lifted from its cradle.

Referring now to the schematic diagram of Figure 9, electrical energy is supplied to the lamp attachment from the ordinary house supply, through the medium of conductors 68, 70. These are extended through a suitable opening formed in the back wall 38, the conductor 68 being extended to a terminal 72 secured to one of the terminal support plates 46 contiguous to the contact 66 thereof. The conductor 70 is extended to the contact 66 of said support plate.

A lead 74 is extended upwardly through the hollow standard 48, from the terminal 72, said lead extending to one side of a lamp bulb 76 mounted in a suitable socket carried by and within the shade 54. A manually operated switch 78 is provided in said socket.

Extending from the other side of the lamp bulb socket are leads 80, 82. Between opposite ends of the lead 82, there is interposed therein a manually operable switch 84, mounted upon the standard 48 so as to be readily accessible to a user. From the switch 84, the lead 82 extends directly to that terminal 66 disposed contiguous to the terminal 72.

The lead 80, meanwhile, is extended from the lamp bulb socket directly to the other terminal 66.

Thus, whenever the switch 78 is turned to "on" position, and the switch 84 is left in "off" position, the lamp bulb will remain dark until such time as the transmitter-receiver is lifted from its cradle 16. On elevation of the transmitter-receiver, the spring 64 will bias the contact bar 62 into engagement with the respective contacts 66, so as to close a circuit therethrough, as a result of which the lamp bulb will be automatically illuminated. The lamp bulb will remain illuminated until such time as the transmitter-receiver is replaced in its cradle.

Should it be desired that the lamp remain illuminated while the transmitter-receiver is in its cradle, it is necessary merely to close the switch 84, the switch 78 being left in "on" position.

I believe that it will be apparent from the description which has been provided that the attachment formed in accordance with the present invention is readily associated with a telephone instrument of conventional design, without necessity of its being connected to the instrument directly in any way. It is merely necessary to insert the instrument in the tray, after which said instrument is used in the regular manner.

The lamp attachment is further designed in such a manner as to permit its use as a lamp, without regard to the automatic switching arrangement inherent therein. This has value in that the attachment is capable of use as a night light, or as a regular lamp, whenever desired.

It is also an important characteristic of the invention that the lamp provides a desirable item of decoration, that harmonizes with the instrument design, and in this connection, it will be understood that the lamp attachment can be provided with any desired ornamental configuration or type of lamp bulb, so as to permit its use as a desk lamp, telephone lamp, or bedside lamp, to state a few examples.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a lamp attachment for a telephone instrument of the type including a combined transmitter-receiver and an instrument base having a sloping back wall, a lamp base; a bulb carried thereby and arranged to illuminate said instrument when energized; a tray proportioned to snugly receive said instrument base, said tray and lamp base having a common, vertical back wall spaced closely from and cooperating with the sloping back wall of the instrument base to form a triangular area therebetween above the back edge of the instrument base, said common wall supporting the lamp base above said area in close proximity to the telephone instrument; a lever housing fitted snugly within said triangular area and secured to the lamp base; a lever mounted in said housing and having one end disposed below the transmitter-receiver for rocking of the lever to one extreme position under the weight of the transmitter-receiver; a contact bar carried by the other end of the lever; spaced contacts carried by opposite walls of the lever housing in circuit with said bulb and spaced from said bar in said extreme position of the lever; and a spring interposed between the lever and the common back wall of the tray and lamp base, and arranged to bias the lever to another extreme position when the lever is relieved of the weight of the transmitter-receiver, for bridging of said contacts by the bar to close a circuit to the lamp bulb.

2. In a lamp attachment for a telephone instrument of the type including a combined transmitter-receiver and an instrument base having a sloping back wall, a lamp base; a bulb carried thereby and arranged to illuminate said instrument when energized; a tray proportioned to snugly receive said instrument base, said tray and lamp base having a common, vertical back wall spaced closely from and cooperating with the sloping back wall of the instrument base to form a triangular area therebetween above the back edge of the instrument base, said common wall supporting the lamp base above said area in close proximity to the telephone instrument; a lever housing fitted snugly within said triangular area and secured to the lamp base; a lever mounted in said housing and having one end disposed below the transmitter-receiver for rocking of the lever to one extreme position under the weight of the transmitter-receiver; a contact bar carried by the other end of the lever; spaced contacts carried by opposite walls of the lever housing in circuit with said bulb and spaced from said bar in said extreme position of the lever; and a spring interposed between the lever and the common back wall of the tray and lamp base, and arranged to bias the lever to another extreme position when the lever is relieved of the weight of the transmitter-receiver, for bridging of said contacts by the bar to close a circuit to the lamp bulb, said lever including a substantially horizontal upper leg disposed below the transmitter-receiver and an inclined lower leg depending from said upper leg and extending in approximate parallelism with the sloping back wall of the instrument base within the lever housing.

References Cited in the file of this patent

UNITED STATES PATENTS

| Number | Name | Date |
|---|---|---|
| D. 155,347 | Katz | Sept. 27, 1949 |
| 2,020,016 | Brusseau | Nov. 5, 1935 |
| 2,247,591 | Sundee | July 1, 1941 |
| 2,464,595 | Masabny | Mar. 15, 1949 |
| 2,561,950 | Shenk | July 24, 1951 |